United States Patent [19]
Alain

[11] Patent Number: 4,724,704
[45] Date of Patent: Feb. 16, 1988

[54] DEVICE FOR EVALUATING THE DEFORMATION OF PNEUMATIC TIRES

[75] Inventor: Clerc Alain, Arcueil, France

[73] Assignee: Institut National de Recherche Sur Les Transports et Leur Secutite, Arcueil, France

[21] Appl. No.: 947,781

[22] Filed: Dec. 30, 1986

[30] Foreign Application Priority Data

Dec. 30, 1985 [FR] France ................ 85 19378

[51] Int. Cl.$^4$ .................. B60C 23/00; G01M 17/02
[52] U.S. Cl. ............................ 73/146.2; 250/560
[58] Field of Search .......... 73/146.2, 146; 340/58; 250/560, 561

[56] References Cited

U.S. PATENT DOCUMENTS

| | | | |
|---|---|---|---|
| 1,849,730 | 3/1932 | Morse | 73/146 |
| 2,051,042 | 8/1936 | Hendel et al. | 73/146 |
| 3,724,958 | 4/1973 | Callan | 250/560 |
| 3,787,700 | 1/1974 | Chasson | 250/560 |

Primary Examiner—Donald O. Woodiel
Attorney, Agent, or Firm—Sughrue, Mion, Zinn, Macpeak, and Seas

[57] ABSTRACT

A device for evaluating the deformation of vehicle tires running along the ground comprises: means (10, ..., 32, 34, 40, ...) for measuring the length ($l_1$) of a first chord of said tires (1), said first chord extending along a first direction at a first distance from said ground; means (40) for calculating a theoretical length for a second chord of said tire located at a second distance from the ground as a function of the length of said first chord and of said first distance from the ground; means (10, ..., 37, 40, ...) for measuring the length ($l_1$) of said second chord of said tire (1) situated at said second distance from the ground; and means (40) for comparing the theoretical length of said second chord with the measured length of said second chord, and for generating an output signal representative of said comparison.

10 Claims, 7 Drawing Figures

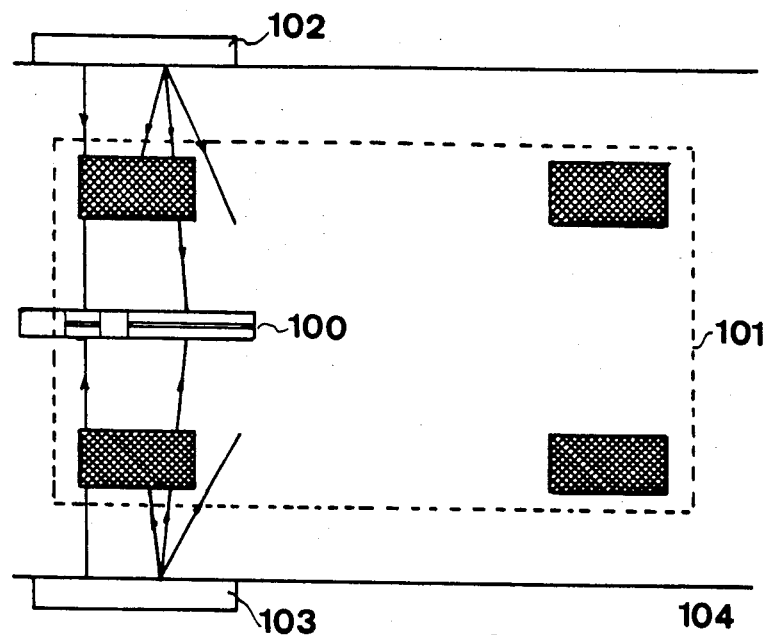
fig.4
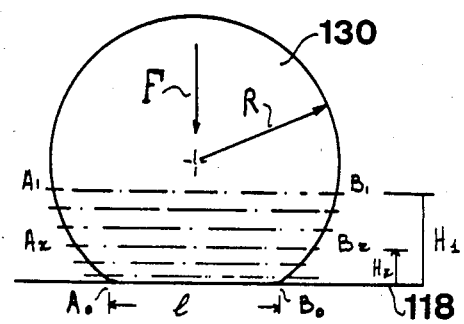
fig.5
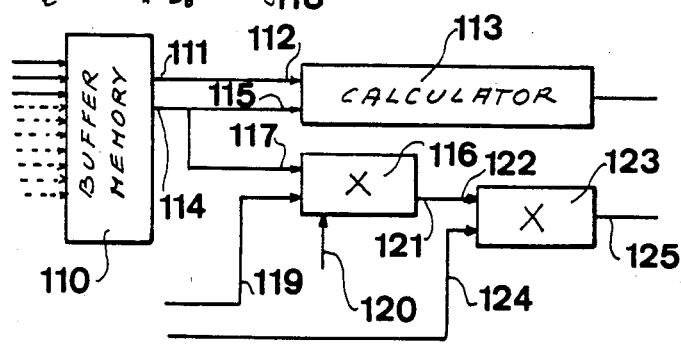

DEVICE FOR EVALUATING THE DEFORMATION OF PNEUMATIC TIRES

The present invention relates to devices for evaluating the deformation of pneumatic tires, and more particularly their radial deformation for the purpose, for example, of deducing whether they are properly inflated or for deducing the size of the load they are carrying.

BACKGROUND OF THE INVENTION

The vast majority of land vehicles move over the ground by means of wheels, and vast majority of such wheels are constituted by rims having pneumatic tires mounted therearound which are kept in shape by internal air pressure. In order to enable tires to operate correctly, they need to be inflated to an appropriate pressure, generally as specified by the manufacturer. Thus, when a vehicle's tires are in good condition and inflated to the correct pressure, the vehicle normally enjoys a considerable safety margin in road-holding characteristics. However, when tires are not inflated to the correct pressure, the danger of an accident is considerably increased. It has been observed that many users do not verify their tire pressures sufficiently carefully or sufficiently often and as a result the tire pressure of many vehicles is often too low.

Systems do indeed exist for verifying the pressure of such tires. However these systems are essentially based on having a pressure sensor placed directly on the tire being monitored together with a readout for the measured pressure which may be situated, for example, in a pilot's field of view. It will be understood that although such devices give good results, they suffer from numerous drawbacks which have considerably limited their use, and in particular they are not routinely installed on all land vehicles. In particular, such systems tend to be found only on aircraft as part of the safety procedures to be followed during takeoff and landing. The main difficulties in developing such devices lie in their high cost due, in particular, to the difficulty in providing coupling between the pressure sensor and the readout, since the pressure sensor is mounted on the tire and must be capable of rotating therewith.

The present invention therefore has the aim of providing a device for evaluating the deformation of vehicle tires in order to deduce, in particular, the pressure to which they are inflated, which device should be easy to use and should not be expensive on its own, and above all should not be expensive per tire checked.

SUMMARY OF THE INVENTION

More precisely, the present invention provides a device for evaluating the deformation of vehicle tires while said tires are running on the ground, said device comprising:

means for measuring the length of a first chord of said tires, said first chord extending along a first direction at a first distance from said ground;

means for calculating a theoretical length for a second chord of said tire located at a second distance from the ground as a function of the length of said first chord and of said first distance from the ground;

means for measuring the length of said second chord of said tire situated at said second distance from the ground; and means for comparing the theoretical length of said second chord with the measure length of said second chord, and for generating an output signal representative of said comparison.

BRIEF DESCRIPTION OF THE DRAWINGS

Embodiments of the invention are described by way of example with reference to the accompanying drawings, in which:

FIG. 4 is a diagram showing a second improvement to the embodiment shown in FIGS. 1 to 3;

FIG. 5 is a diagram of a particular embodiment of the device in one particular application.

MORE DETAILED DESCRIPTION

Figure 1A:
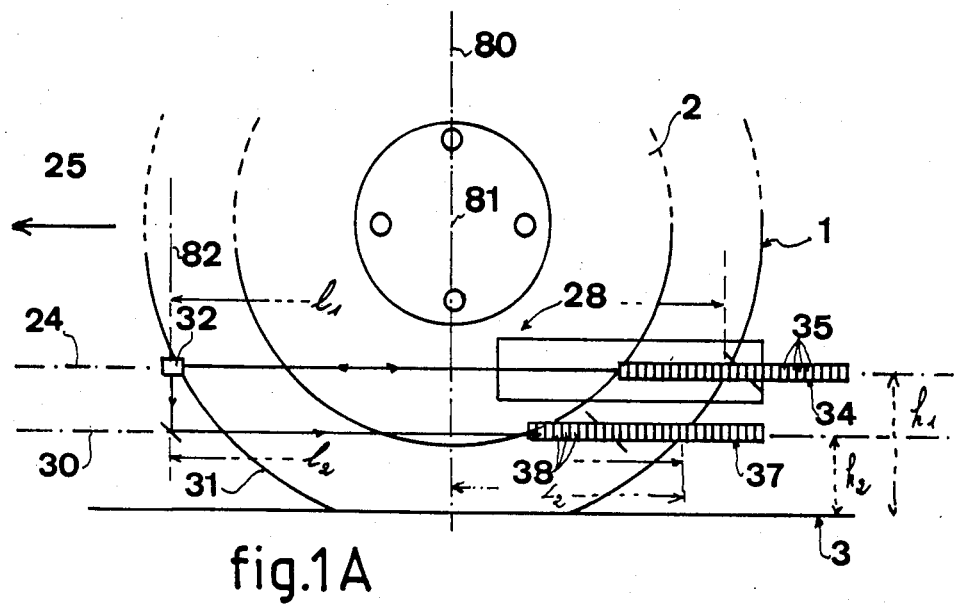
FIGS. 1A and 1B are a diagrammatic side view and plan view respectively of a portion of a first implementation of a device in accordance with the invention.
Figure 1B:
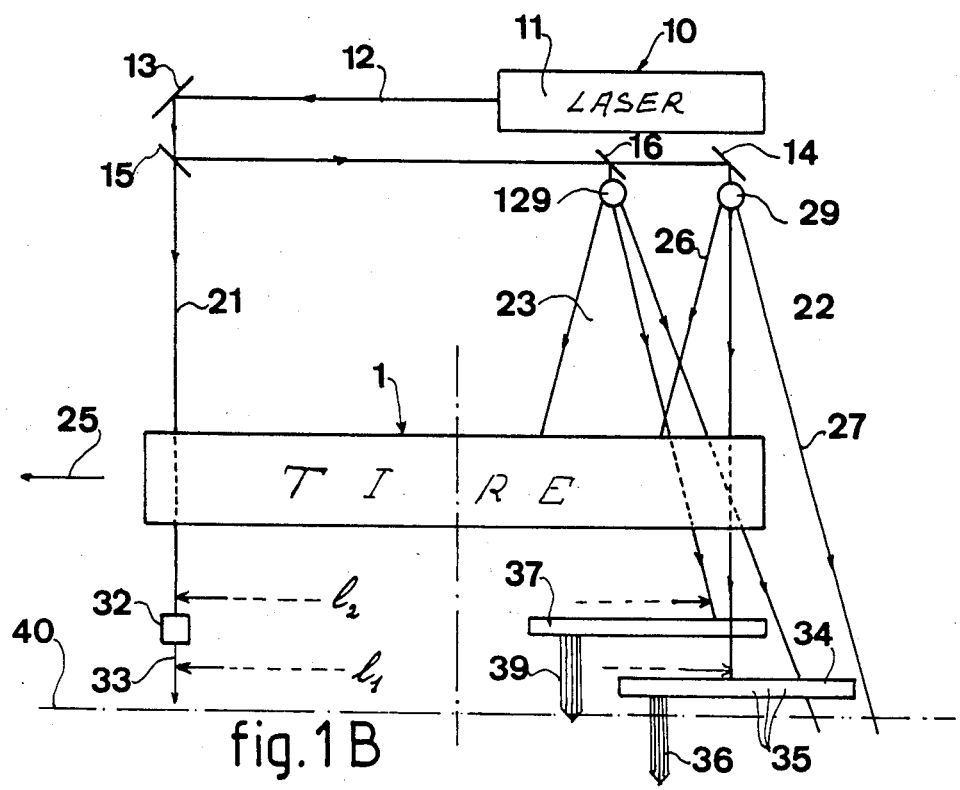

FIGS. 1A and 1B show a portion of a device for evaluating deformation of a tire 1 mounted, for example, on a wheel rim 2. In general, the tire is kept in shape under the action of air pressure in an air chamber disposed between the rim and the tire. The air chamber may be constituted by an inner tube typically distinct from the tire and the rim, or it may be constituted by the tire and the rim themselves (i.e. a so-called "tubeless" tire). The wheel rim is generally mounted on a shaft which is coupled to a motor and to a chassis in order to allow a vehicle to move along ground 3. Tire manufacturers take great care in determining the optimum value to which their tires should be inflated, from a safety point of view, and in particular when moving at speed.

The portion of the device shown in FIGS. 1A and 1B comprises a generator 10 for generating a narrow parallel light beam 12, for example a helium-neon type laser generator for generating a laser beam. The beam 12 from the generator is split into at least three light beams 21, 22, and 23, by means of a set of reflecting and semi-reflecting elements 13, 14, 15, and 16, . . . for example totally or partially reflecting mirrors or prisms, etc.

The first two light beams 21 and 22 are both situated in a first plane 24 which is substantially parallel to the plane of the ground 3, and at a height $h_1$ from said ground. The first beam 21 is a narrow parallel beam contained in this plane and, in this embodiment, it propagates along a direction which is substantially perpendicular to the direction 25 of tire displacement. The second beam 22 which is also contained in the first plane 24 is a plane diverging beam. The beam 22 is located at a certain distance from the first beam 21 so that the two distances between the narrow beam 21 and the edge rays 26 and 27 of the diverging beam 22 are respectively less than and greater than the chords 28 of the tire 1 at a height $h_2$ above the ground in a plane parallel to the ground.

The third beam 23 is also a plane diverging beam and is disposed so as to extend in a second plane 30 which is parallel to the plane of the ground 3 and which is at a height $h_2$ thereabove, where $h_2$ is less than $h_1$ and may be equal to substantially one-half of $h_1$, but is advantageously as close to the ground as possible.

Further, this third beam 23 is positioned to meet the edge 31 of the circumference of the tire which has the above-specified chord 28.

In addition, the device includes on each path of the three beams 21, 22, and 23, and beyond the path 25 of the tire, a set of light sensitive detectors. A first detector 32 is constituted by a cell disposed on the path of the beam 21 and is suitable for delivering an electronic signal at its output 33 capable of taking up two logic states "1" or "0", depending on whether or not the cell is receiving the beam 21.

A second detector 34 is constituted by a strip comprising a plurality of photocells 35 juxtaposed in the plane 24 over a length which is substantially equal to the width of the beam 22 when it reaches this strip 34. The strip 34 of cells 35 has a plurality of outputs 36 each of which is suitable for delivering a binary signal having one of two logic state "1" or "0" depending on whether the corresponding cell 35 is not receiving light from the beam 22.

Finally, a third detector 37 is constituted like the detector 34 by a strip comprising a plurality of photocells 38 and is disposed on the path of the beam 23 and extends over a length substantially equal to the width of the beam where it meets the strip 37, which strip has a plurality of outputs 39 suitable for delivering binary signals as described above.

Figure 2:
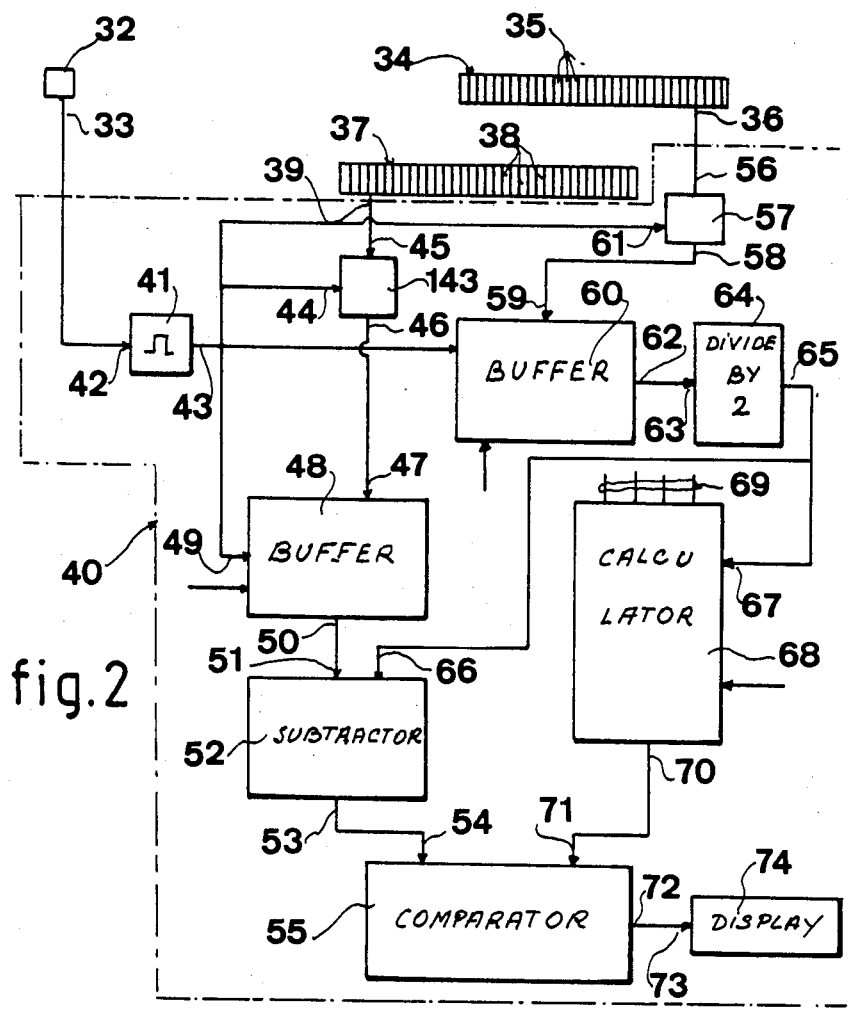
FIG. 2 is a block diagram of one embodiment of another portion of a device in accordance with the invention, said other portion being complementary to the portion shown in FIGS. 1A and 1B.

These three outputs 33, 36, and 39 from the detectors are connected to an electronics set 40 for processing the signals delivered on the outputs, and an example of a suitable embodiment for said electronics set 40 is shown in FIG. 2.

This electronics set 40 comprises a monostable 41 whose trigger input 42 is connected to the output 33 of the detector 32. The output 43 from the monostable 41 is connected to the control inputs of first and second sets of gates 143 and 57 and first and second buffer memories 48 and 60. In particular, the output 43 from the monostable 41 is connected to the input 44 of the first set of logic gates 143 whose other inputs 45 are connected to the outputs 39 of the strip 37 of cells 38. The outputs 46 from the set of gates 143 are connected to the inputs 47 of the buffer memory 48 whose control input 49 is connected to the output 43 of the monostable 41. The outputs 50 from the buffer memory 48 are connected to inputs 51 of a subtractor 52 whose outputs 53 are connected to a first set of inputs 54 to a comparator 55.

In FIG. 2 heavy lines have been used to mark connections comprising a plurality of binary signals connected in parallel.

The outputs 36 from the first strip 34 of cells 35 are connected to the inputs 56 of the set of logic gates 57 whose outputs 58 are connected to the inputs 59 of the buffer memory 60 whose control input is connected to the output 43 from the monostable 41. The control input 61 to the set of logic gates 57 is likewise connected to the output 43 from the monostable 41.

The outputs 62 from the buffer memory 60 are connected to the inputs 63 of a divide-by-two circuit 64. The outputs 65 from the divider 64 are connected firstly to the second set of inputs 66 to the subtractor 52 and secondly to a set of inputs 67 to a calculator 68 which also includes inputs 69 for receiving the values of various parameters needed to perform the necessary calculations. The result outputs 70 from the calculator 68 are connected to the second set of inputs 71 to the comparator 55. The comparator 55 has an output 72 connected to the input 73 of a display 74. A single connection is shown between the comparator 72 and the display 74 since the display may be limited to a binary good/bad indication, e.g. using light emitting diodes (LEDs). It will readily be appreciated that a more complex display could be provided, in which case additional connections would be needed.

The device described above with reference to FIGS. 1A, 1B, and 2 operate as follows.

Assume that a wheel is travelling over the ground 3 in the direction indicated by arrow 25. When the tire occupies the position shown in FIG. 1A (even if it occupies that position only instantaneously), it interrupts the propagation of the first light beam to the photocell 32. In this case the photocell 32 delivers a signal at its output 33 which passes from one logic state to another, for example from "1" to "0". This change of state triggers monostable 41 which delivers a short control pulse of predetermined duration at its output 43, thereby opening the sets of logic gates 143 and 57. Thus, the signals delivered at the outputs 39 and 36 from the strips of photocells (photodiodes) 37 and 34 are respectively applied at this instant to the inputs of the buffer memories 48 and 60 where they are stored under the control of the output signal from the monostable 41. Since the tire masks a portion of each of the beams 22 and 23 (see FIG. 1B) these signals are functions respectively of the lengths $l_1$ and $l_2$, i.e. the length of the chord of the tire situated in the plane 24 at height $h_1$ from the ground 3 and the length of the chord situated in plane 30 at a height $h_2$ from the ground 3.

The signal stored in the buffer memory 60 is applied to the divide-by-two circuit 64 which then delivers an output signal which is representative of one-half of the chord length $l_1$, such that the signal present on its outputs 65 is representative of the origin position of the chords relative to a vertical plane 80 passing through the axis of rotation 81 of the tire. This value is thus representative of the distance between the vertical plane 82 passing through the detector 32 and the plane 80 passing through the tire axis. The signal present on outputs 65 is applied to the second set of inputs 66 of the subtractor 52, thereby obtaining a signal on the outputs 53 representative of the difference $l_2-(\frac{1}{2})l_1$, i.e. to the value of the half-chord $L_2$ measured in the plane 30 at height $h_2$ of the strip 37. The signal on outputs 65 is representative of half-chord at height $h_1$ and is applied to inputs 67 of the calculator 68 which has other inputs 69 on which it receives various parameters, including the values $h_1$ and $h_2$ which are determined by construction. The calculator delivers a signal on its outputs 70 representative of the theoretical length $L_c$ of a half-chord at height $h_2$ above the ground 3. Given the values $h_1$, $h_2$, and $(\frac{1}{2})l_1$ calculation gives:

$$L_c = \sqrt{\frac{l_1^2}{4} \cdot \frac{h_2}{h_1} + h_2(h_1 - h_2)}$$

This theoretical value obtained at the outputs 70 is applied to the second set of inputs 71 of the comparator 55 which receives the measured value $L_2$ on its first set of inputs 54. Depending on whether or not the values $L_c$ and $L_2$ are identical (or substantially identical) or significantly different, the comparator delivers a binary signal on its output 72 capable of raising an alarm if necessary on the display 74.

If the two value $L_c$ and $L_2$ are not substantially equal, then the tire does not have a substantially cylindrical envelope, or else it does not have a normal amount of deformation as defined by the tire manufacturer. The length $L_2$ is then greater than $L_c$ which indicates that the tire pressure too low. The extent to which the tire is under-inflated may be pre-established experimentally as a function of the difference $L_2-L_c$. In any event, the driver of the vehicle including a tire which has been detected as being under-inflated should be warned that the vehicle is dangerous to drive until the tire has been properly inflated.

The above description relates to verifying the pressure in only one tire. However, most vehicles have four or more tires whose pressures all need to be checked.

Figure 3:
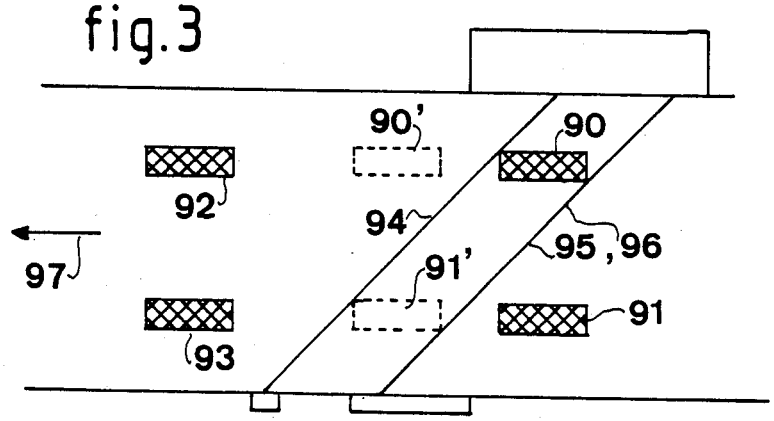
FIG. 3 is a diagram showing a first improvement to the embodiment shown in FIGS. 1A, 1B and 2.

It is thus important to be able to check four tires. Further, it is advantageous to be able to use a single measuring device for checking all four tires. FIG. 3 shows an embodiment of a device in accordance with the invention for inspecting four tires 90, 91, 92, and 93 of a motor vehicle. Since pairs of wheels are generally located on the same axis perpendicular to the direction of vehicle travel, it is not possible to position the laser generator and the beam splitters on one side of the vehicle with the photosensors on the other if the beams extend perpendicularly to the direction of vehicle travel. Thus the configuration shown in FIG. 3 has beams 94, 95, and 96 corresponding to the three beams 21, 22, and 23 but propagating at an oblique angle relative to the direction of vehicle travel 97, so that the beams are masked by only one wheel at a time. Under these conditions, as the moving vehicle passes through the beams 94, 95, and 96, its wheels are checked in the order: 92, 93, 90, and 91. By way of example, tires 90 and 91 are shown in dashed lines at 90' and 91' in the positions that they occupy when the wheel 91 is being checked after the wheel 90 has been checked.

The solution shown in FIG. 3 is satisfactory providing that the tires are not too wide and that parallax errors can be ignored.

However, because of the wide variety of tires in everyday use, parallax error is not, in general, negligible since it varies from vehicle to vehicle. One way of mitigating this drawback is to use a set of two devices in accordance with the invention with the detectors located, for example, in the middle 100 of the path 104 of the vehicle 101, and with two light beam generators 102 and 103 placed on either side of the path 104, as shown in FIG. 4. Naturally an equivalent result can be obtained with the light beam generators in the middle at 100 and the strips of photocells disposed on either side of the path 104.

It is mentioned above that the degree of tire deformation may be evaluated in greater detail than providing a mere good/bad signal.

FIG. 5 shows an embodiment of a tire inspecting device applicable to determining the force to which the tire is subjected, for example for determining the weight of a vehicle by integrating the forces exerted on all of the vehicle tires.

To do this, the device includes a plurality of strips of photocells disposed at respective heights $h_1, h_2, \ldots, h_x$ above the ground.

As in the device described with reference to FIGS. 1A, 1B, and 2, a plurality of chords are measured:

$A_1B_1, A_2B_2, \ldots, A_xB_x$.

These measurements are stored in a buffer memory 110 which also stores the radius R of the tire, which radius is delivered in the form of a signal on an output 111 and applied to an input 112 of a calculator 113. The buffer memory 110 has an output 114 suitable for delivering a signal corresponding successively to the various different chord lengths as measured by means of the strips of photocells. Each measured chord length signal is applied to an input 115 of the calculator 113. The calculator is suitable for performing a calculation based on the equation:

$$D_x = 2\sqrt{2h_xR - h_x^2} - A_xB_x$$

The result of this calculation represents the difference between the value of the calculated chord length and the value of the measured chord length. $D_x$ is thus a magnitude representative of tire deformation.

In addition, the device includes a multiplier 116 which has a first input 117 connected to receive the length of the chord measured where the tire is in contact with the ground 118, i.e. the chord $A_0B_0$ which has a length $l_0$. The other input 119 of the multiplier is suitable for receiving a signal representative of the width $L_0$ of the tire, and a further input 120 is suitable for receiving a signal representative of a force factor K. The multiplier is suitable for delivering a signal on its output 111 having a value representative of the product:

$K \cdot L_0 \cdot l_0 = S_0$.

The signal $S_0$ is then applied to a first input 122 of a second multiplier 123 having a second input 124 receiving a signal representative of the pressure P in the tire, which pressure may have been evaluated by means of a device as described with reference to FIGS. 1A, 1B, and 2. As a result, the output 125 to the multiplier 123 delivers a signal which is equal to the product $P \cdot S_0$ i.e. to the force F pressing the tire 130 against the ground.

The embodiments of the invention described above give very good results for normal applications in which there is a need to measure the deformation of tires, and particular motor vehicle tires, since under such normal circumstances all that is required is a good/bad evaluation with thresholds that are relatively far apart.

Figure 6:
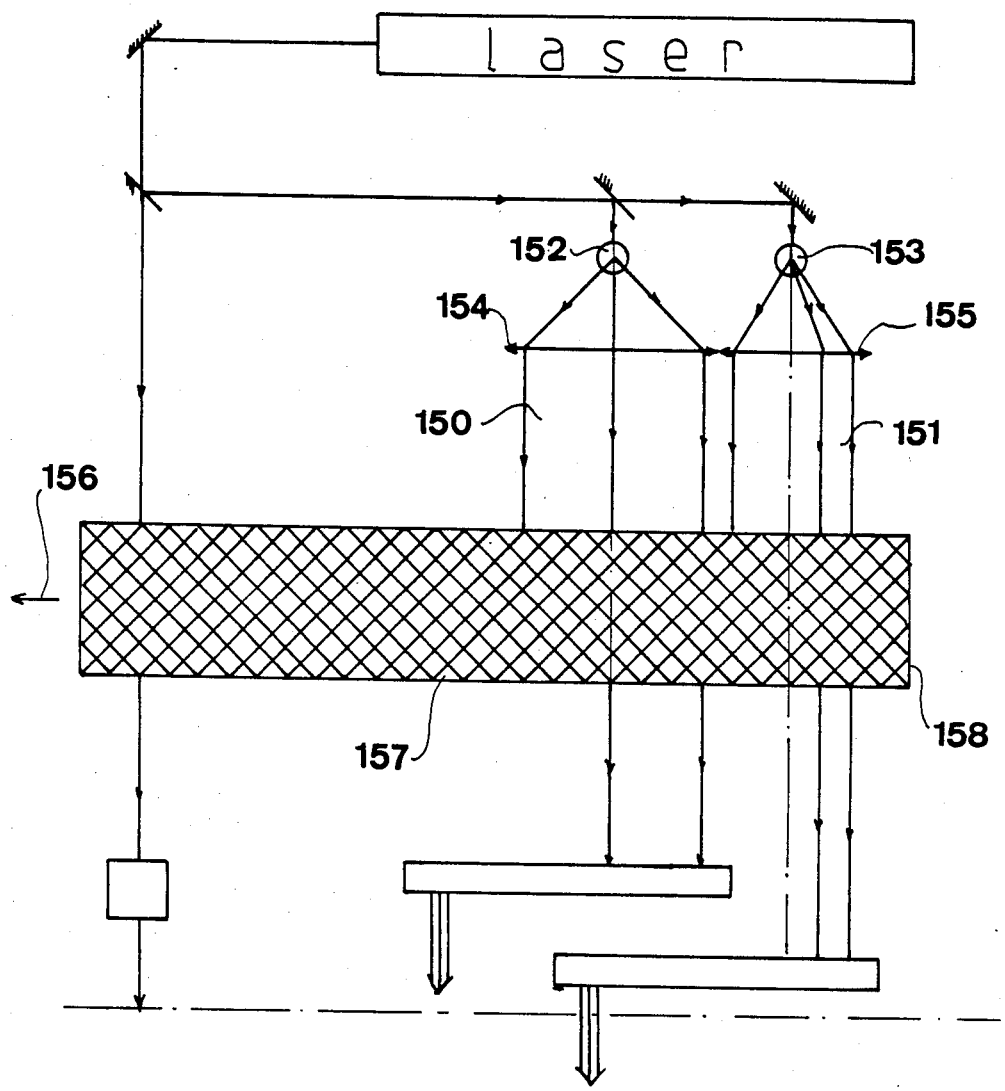
FIG. 6 shows an improvement of the embodiments shown in FIGS. 1 to 4.

However, when greater accuracy is required, parallax error must be reduced as far as possible, and in this case a device is needed in which the second and third beams are no longer constituted by diverging beams as shown in FIG. 1B but by flat beams having parallel rays as shown in FIG. 6. These two flat beams 150 and 151 are obtained, for example, by means of an afocal system constituted for example by a first cylindrical lens 152 or 153 associated on a common optical axis with converging lens 154 and 155 having its focal plane at the optical center of the cylindrical lens. In this case, the first beam is advantageously perpendicular to the direction 156 of travel of a tire 157, with the wide beams 150 and 151 also being perpendicular thereto. As a result the beams which normally fall on the detectors and strips of photocells and which are marked by the passage of a tire are all parallel and above all they are substantially parallel to the tread 158 of the tire. The points at which the beams are tangential to the tire thus all lie in the same vertical plane extending parallel to the direction 156 of tire travel, thereby eliminating parallax errors and giving more accurate measurements.

What is claimed is:

1. A device for evaluating the deformation fo vehicle tires running along the ground, the device comprising:
   means for measuring the length of a first chord of said tires, said first chord extending along a first direction at a first distance from said ground;
   means for calculating a theoretical length for a second chord of said tire located at a second distance from the ground as a function of the length of said first chord and of said first distance from the ground;
   means for measuring the length of said second chord of said tire situated at said second distance from the ground; and
   means for comparing the theoretical length of said second chord with the measured length of said second chord, and for generating an output signal representative of said comparison.

2. A device according to claim 1, wherein the means for measuring the first chord of said tires comprise:
   a first light beam source suitable for emitting at least two substantially parallel beams, namely a first beam and an associated second beam which are at a predetermined distance apart, said second beam being a relatively wide plane beam and the two distances between the first beam and the edges of said second beam being respectively greater than and less than the lengths of said first chords to be measured, both of said beams being disposed at a first predetermined height above the ground over which the tire to be measured runs;
   first light sensitive detectors disposed on the paths respectively of said two light beams and suitable for delivering signals representative of the quantity of light received; and
   first means for generating a signal representative of the length of said first chord as a function of the signals generated by said first light sensitive detectors.

3. A device according to claim 2, wherein the means for measuring the length of said second tire chord situated at said second height above the ground comprise:
   a second light beam source suitable for emitting at least one third wide and flat beam substantially parallel to said second beam and to said ground, the distance between a determinable origin point outside the beam and the two edges of said third beam being respectively less than and greater than the expected lengths of the chords to be measured, said third beam being situated at said second predetermined height above the ground;
   second light sensitive detectors suitable for delivering signals representative of the quantity of light received; and
   means for generating a signal representative of the length of said second chord as a function of the signals generated by said second light sensitive detectors.

4. A device according to claim 3, wherein the directions of said first, second and third beams are mutually parallel and extend at a predetermined angle to the direction of tire displacement.

5. A device according to claim 4, wherein said predetermined angle is a right angle.

6. A device according to claim 4, applicable to checking the tire pressures of a multi-wheel vehicle, wherein said predetermined angle is determined in such a manner as to enable the light beams to pass obliquely between said wheels.

7. A device according to claim 3, wherein said first and said second sources for delivering said second and third beams include at least one cylindrical lens.

8. A device according to claim 7, wherein said source additionally includes a converging lens whose focus is located at the point of divergence of said cylindrical lens.

9. A device according to claim 1, wherein said first means for generating a signal include a calculator suitable for calculating the theoretical length $L_c$ of one-half of said second chord using the following equation:

$$L_c = \sqrt{\frac{l_1^2}{4} \cdot \frac{h_2}{h_1} + h_2(h_1 - h_2)}$$

where $h_1$ and $h_2$ are respectively said first and second heights above the ground, and where $l_1$ is the measured length of said first chord.

10. A device according to claim 1, including means for determining the pressure in said tire as a function of its deformation, and means for determining the force with which said tire is pressed against the ground as a function of said pressure in said tire.

* * * * *